(Model.)

L. SHEPARD.
Harrow.

No. 240,777. Patented April 26, 1881.

WITNESSES:
Francis McArdle
C. Sedgwick

INVENTOR:
L. Shepard
BY Munn & Co.
ATTORNEYS.

UNITED STATES PATENT OFFICE.

LEWIS SHEPARD, OF MACE, INDIANA, ASSIGNOR TO HIMSELF AND JOHN W. HOGSETT, OF SAME PLACE.

HARROW.

SPECIFICATION forming part of Letters Patent No. 240,777, dated April 26, 1881.

Application filed February 16, 1881. (Model.)

*To all whom it may concern:*

Be it known that I, LEWIS SHEPARD, of Mace, in the county of Montgomery and State of Indiana, have invented a new Improvement in Harrows, of which the following is a full, clear, and exact description.

Figure 1:
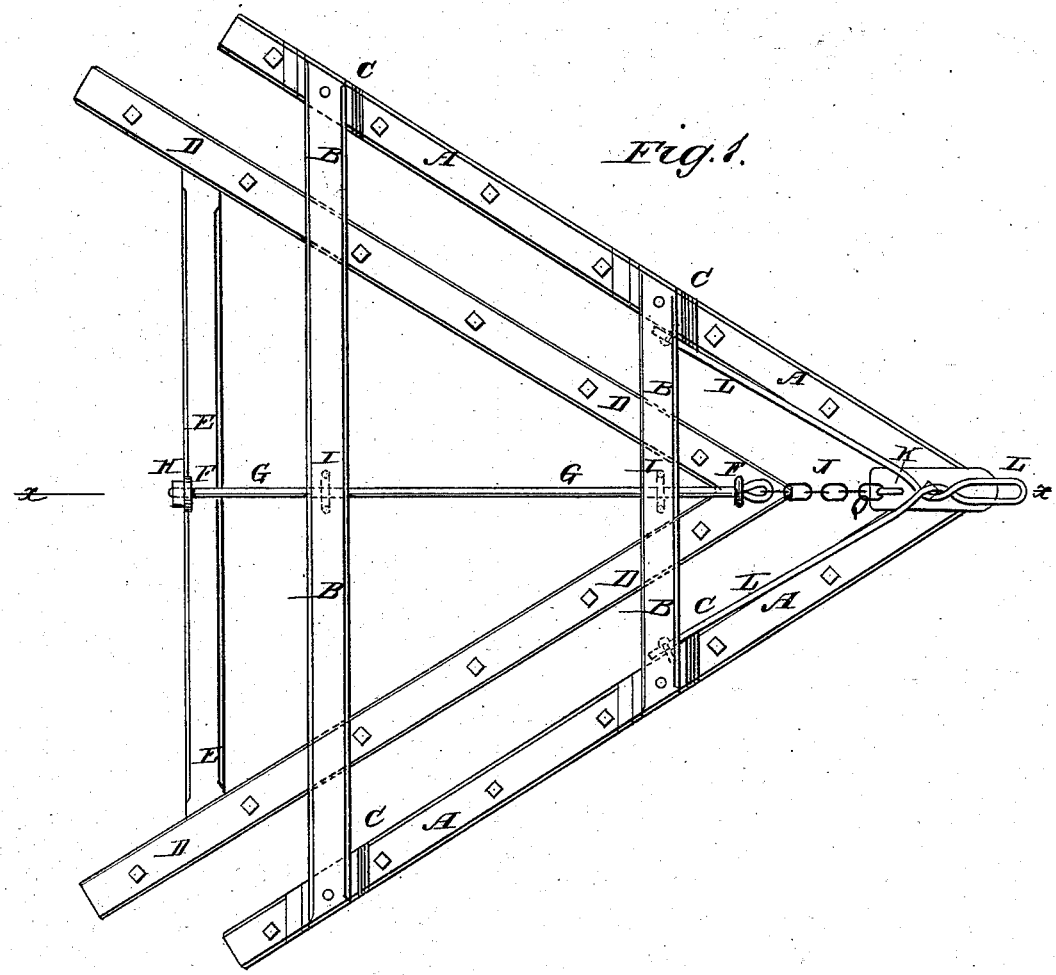
Figure 2:
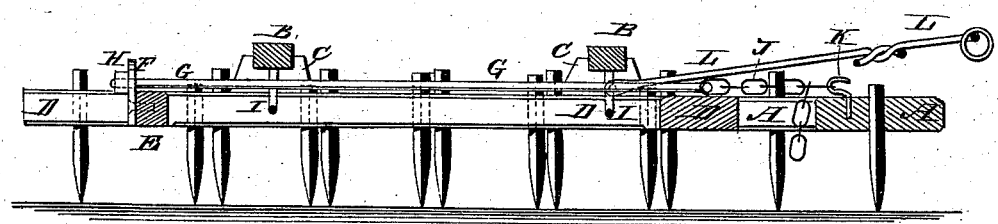

Figure 1 is a plan view of my improvement. Fig. 2 is a sectional side elevation of the same, taken through the line $x\,x$, Fig. 1.

The object of this invention is to improve the construction of harrows in such a manner that they can be conveniently adjusted to better adapt them for various kinds of work.

The harrow is made in two parts, each of which is made in the shape of what is known as the "A-harrow."

A are the side bars of the outer part of the harrow, the forward ends of which meet at an angle. The side bars A are connected a little in front of their centers and at their rear ends by cross-bars B. Blocks C are interposed between the side bars A and the ends of the cross-bars B, to raise the said cross-bars B above the level of the said side bars A, so that they will be out of the way of the inner part of the harrow, and will thus allow the said inner part to work upon a level with the outer part and give the said inner part sufficient play to allow it to work freely.

D are the side bars of the inner part of the harrow, the forward ends of which meet at the same angle as the side bar A. The side bars D are connected at their rear ends by the cross-bar E.

To the forward ends of the side bars D, and to the center of the cross-bar E, are attached staples F, through which passes a rod, G. The rod G is secured in place by a nut, H, screwed upon its rear end, so that the said rod G can be conveniently detached to allow the parts of the harrow to be disconnected. The rod G passes through staples I, attached to the lower sides of the cross-bars B.

To the forward end of the rod G is attached the end of a short chain, J, which is hooked upon a hook, K, attached to the side bars A at their point of meeting. By this construction the parts of the harrow can be adjusted at any desired distance apart, as the character of the ground may require, by adjusting the chain J upon the hook K, the rod G keeping the centers of the parts of the harrow always in line.

L is the draw-bail or hounds, the ends of which are hinged to the inner side of the side bars A, or of the forward blocks, C. The bail or hounds L has a loop or eye formed in its center to receive the draft. By this construction the point of draft attachment is thrown back, to balance the harrow and adapt it to vibrate, and thus more readily adjust itself to uneven ground.

When it is desired to use a tongue the bail or hounds L can be bolted to the said tongue and the draft applied to the tongue, in the ordinary manner.

Having thus described my invention, what I claim as new, and desire to secure by Letters Patent, is—

In a sectional harrow, the combination, with the two sections B C and D E, of the staples F I, the rod G, the chain J, and the hook K, whereby the parts of the harrow are securely and adjustably connected, as described.

LEWIS SHEPARD.

Witnesses:
JAMES G. JOHNSON,
ENOCH T. LYNN.